(12) United States Patent
Britsch et al.

(10) Patent No.: US 7,015,281 B2
(45) Date of Patent: Mar. 21, 2006

(54) ALKALI-STABLE HYDROPHILIC SORBENTS FOR ION-EXCHANGE CHROMATOGRAPHY

(75) Inventors: Lothar Britsch, Reute (DE); Karl-Heinz Derwenskus, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/491,543

(22) PCT Filed: Sep. 9, 2002

(86) PCT No.: PCT/EP02/10072

§ 371 (c)(1),
(2), (4) Date: Apr. 2, 2004

(87) PCT Pub. No.: WO03/031062

PCT Pub. Date: Apr. 17, 2003

(65) Prior Publication Data

US 2004/0266896 A1 Dec. 30, 2004

(30) Foreign Application Priority Data

Oct. 5, 2001 (DE) ................................ 101 49 256

(51) Int. Cl.
*C08G 63/47* (2006.01)

(52) U.S. Cl. ........................ 525/61; 525/118; 525/162; 525/173; 526/307.2; 526/332; 526/336; 536/93

(58) Field of Classification Search .................. 525/61, 525/118, 162, 173; 526/307.2, 332, 336; 536/20, 93

See application file for complete search history.

(56) References Cited

U.S. PATENT DOCUMENTS 5,453,186 A * 9/1995 Muller et al. ............ 210/198.2

FOREIGN PATENT DOCUMENTS

| DE | 43 16 136 | 11/1994 |
|---|---|---|
| EP | 0 337 144 | 10/1989 |
| EP | 0 482 339 | 4/1992 |
| WO | 96 14151 | 5/1996 |

* cited by examiner

*Primary Examiner*—James J. Seidleck
*Assistant Examiner*—Olga Asinovsky
(74) *Attorney, Agent, or Firm*—Millen, White, Zelano, Branigan, P.C.

(57) ABSTRACT

The invention concerns alkali-stable hydrophilic sorbents for ion-exchange chromatography. The invention is characterized in that it consists in using as base material a crosslinked vinyl polymerconsisting of vinyl monomers containing diol groups and crosslinking monomers whereof the polymerizable groups are bound by carbonamide-containing chains. Monomers containing ionic groups are grafted on said base material using cerium (IV) salts.

21 Claims, 2 Drawing Sheets

ALKALI-STABLE HYDROPHILIC SORBENTS FOR ION-EXCHANGE CHROMATOGRAPHY

Figure 1:
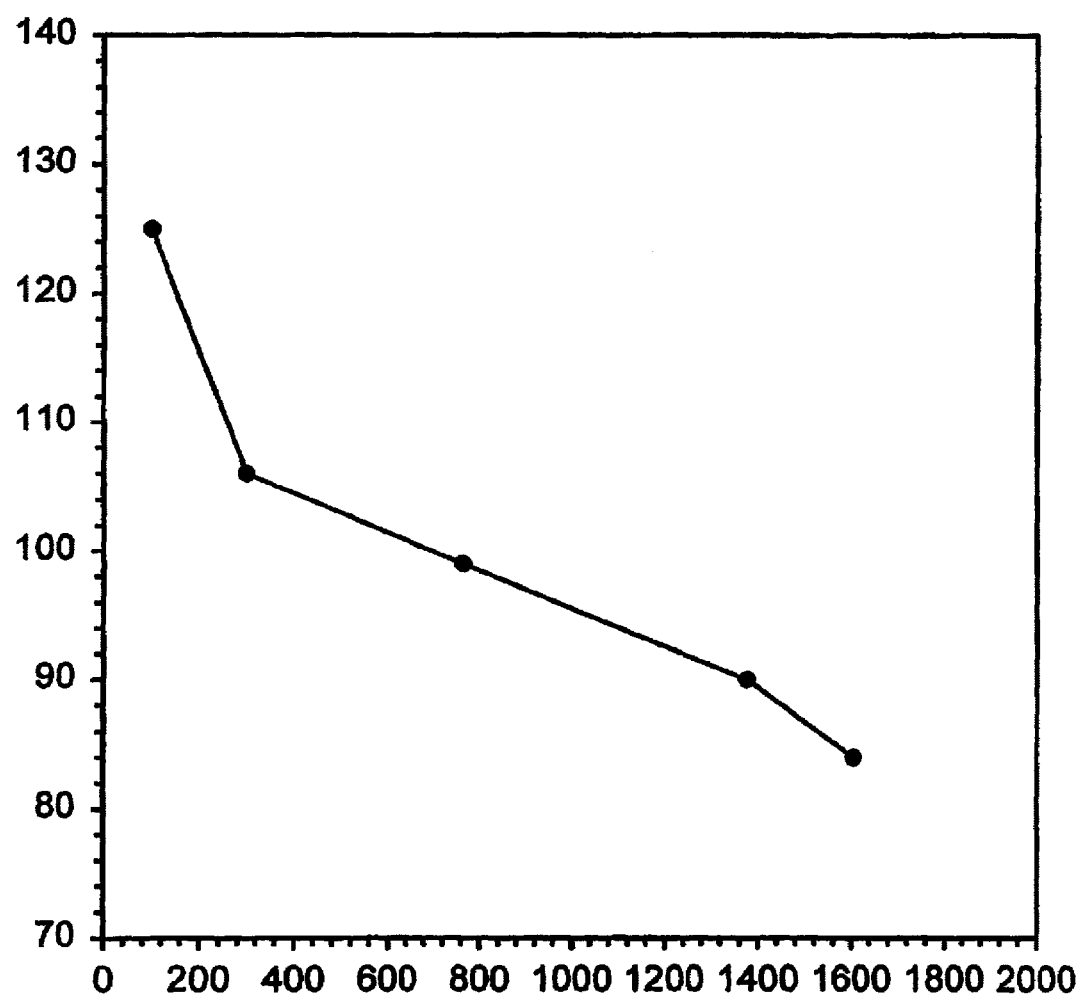

The invention relates to sorbents for ion-exchange chromatography which are particularly suitable for chromatographic separations of biological substances (for example proteins, peptides or nucleic acids, as well as viruses).

In the chromatographic separation of biological substances, in particular in preparative processes, the sorbents have to have a plurality of properties; these include firstly good resistance to alkaline solutions, as are usual for the cleaning of separation devices (cleaning in place: CIP), and adequate mechanical stability in order that high flow rates can be achieved, and also adequate hydrophilicity in order that irreversible binding of the substances to be purified to the sorbent is avoided. Furthermore, a high binding capacity is also necessary in order that the separation processes can be carried out economically. The binding capacity should also be essentially retained at a high flow rate, i.e. not only the static binding capacity, but also the dynamic binding capacity should be high. If the sorbents consist of derivatised, for example grafted materials, essential properties of the base material must not be impaired by the derivatisation.

EP 0 337 144 discloses sorbents for ion-exchange chromatography. According to the teaching of EP 0 337 144, derivatised acrylamide monomers are grafted onto diol-substituted base materials, such as (meth)acrylate-crosslinked polymers or silica gel derivatives. Although the ion exchangers obtainable in this way exhibit good separation properties and good pressure stability, they have, however, only limited stability to alkaline solutions.

The object thus arises to provide sorbents for ion-exchange chromatography having improved properties, in particular improved alkali stability, and a good dynamic binding capacity.

The invention relates to alkali-stable, hydrophilic sorbents for ion-exchange chromatography obtainable by the following process steps:
  a) provision of a base material, where the said base material is a cross-linked vinyl polymer comprising diol group-containing vinyl monomers and crosslinking monomers whose polymerisable groups are linked by carboxamide group-containing chains, and where this base material comprises more than 1 mmol of diol groups per gram;
  b) addition of the base material to an aqueous solution of the monomer or monomers to be grafted, where a monomer contains an ionic group or a precursor group for an ionic group;
  c) grafting of the monomers to the base material, where the graft polymerisation is initiated by means of cerium (IV) ions, and where the process parameters of suspension density (concentration of the base material), monomer concentration, initiator concentration, pH, time, temperature and addition of polymerisation inhibitors are selected in such a way that a degree of grafting of from 0.5 to 2 mmol per gram of support (dry weight) is achieved;
  d) and finally, where appropriate, the precursor groups for ionic groups introduced in step b) are converted into ionic groups.

The invention relates to processes for the preparation of alkali-stable, hydrophilic sorbents for ion-exchange chromatography having the above-mentioned process steps, and to the use of the sorbents obtainable in this way for the separation of at least two substances.

FIG. 1 shows the protein binding capacity of a DEAE ion exchanger prepared in accordance with Example A1 as a function of the linear flow rate; experimental details are given in Use Example B1. Even at a linear flow rate of 1500 cm/h, about 70% of the maximum binding capacity is still measured. The sorbents according to the invention are thus highly suitable for capturing the target substance.

Figure 2:
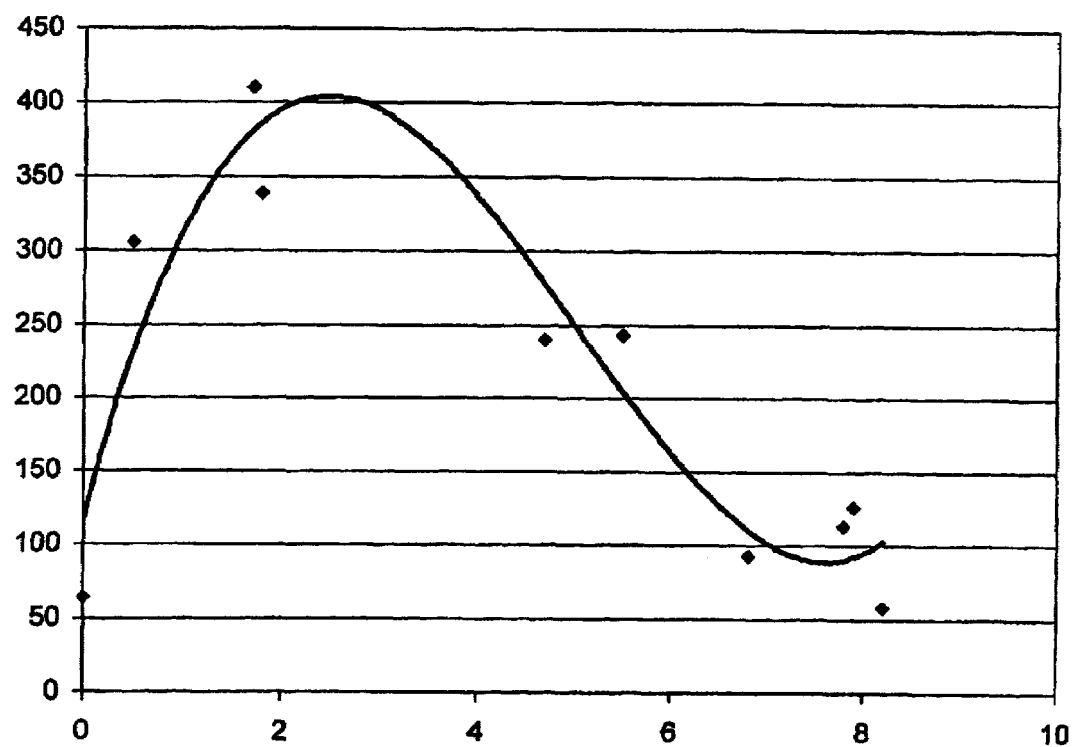

FIG. 2 shows the protein binding capacity of an $SO_3$ ion exchanger prepared in accordance with Example A2 as a function of the degree of grafting; experimental details are given in Use Example B2. The binding capacity as a function of the degree of grafting passes through a curve having a clear maximum at about 0.6 mM per gram of dry weight (corresponding to 2% of sulfur). A binding capacity of about 400 mg of lysozyme per g of gel is achieved.

It has been found that ion exchangers having considerably improved properties are obtainable if base materials having a content of diol groups of greater than 1 mmol per gram of base material (dry weight) are used and the reaction in the graft polymerisation is carried out in such a way that a degree of grafting of from 0.5 to 2 mmol per gram of base material (dry weight) is achieved. Suitable base materials are hydrophilic, macroporous, highly crosslinked polymer materials, in particular crosslinked vinyl polymers comprising diol group-containing vinyl monomers and crosslinking monomers whose polymerisable groups are linked by carboxamide group-containing chains. These contain more than 1 mmol of diol groups per gram of base material, in particular from 2 to 6 mmol of diol groups/g. Preference is given to the use of porous bead copolymers comprising N,N-methylenebisacrylamide and 3-allyloxy-1,2-propanediol (1:0.6) (manufacturer Degussa/Röhm, Darmstadt). The base material used can also be polymers having amidic or ethereal crosslinking and ethereally or amidically bonded aliphatic hydroxyl groups on the surface or groups which can be chemically converted into the latter. The important factor is the presence of hydroxyl groups, preferably in the form of aliphatic diol groups, in adequate concentration on the surface of the base material. In the ideal case, all functional radicals of the monofunctional monomer component of the polymeric base material should be represented by aliphatic diol groups. However, proportions of at least 50% of these groups in the form of diol groups are also suitable. Methods for the determination of diol groups are known to the person skilled in the art. Particularly suitable base materials are disclosed in EP 0 482 339.

The base materials used in accordance with the invention are, in particular, in the form of (macro)porous bead polymers; however, it is also possible to employ nonporous bead polymers or polymers in another form, for example porous cylinders or mouldings having a different shape, or also membranes, filaments or woven fabrics.

Monomers are grafted onto these base materials, with the graft polymerisation, as explained in greater detail below, being controlled in such a way that degrees of grafting of from 0.5 to 2 mmol per gram of base material are obtained. If the upper limit of the degree of grafting is significantly exceeded, the resultant sorbent frequently has impaired mechanical properties. In accordance with the invention, ion exchangers are obtained which have improved properties, in particular an improved dynamic binding capacity, and very good alkali stability.

In accordance with the invention, the grafting is initiated by means of cerium(IV) ions (G. Mino and S. Kaizerman (1958) J. Polymer Science 31, 242–243; G. Mino et al. (1959) J. Polymer Science 38, 393–401). Further details are disclosed in EP 0 337 144. The reaction with cerium(IV)

salts in strongly acidic aqueous solution generates free radicals on the base material, with diol groups apparently reacting more quickly than aliphatic hydroxyl groups. A free-radical chain reaction commences on the free radicals formed in this reaction, with the added monomers being incorporated into the chain. This chain is thus linear and linked to a monomer unit containing the aliphatic radical of the base material. The polymerisation is ended by termination reactions with participation of the cerium salts. For this reason, the (average) chain length can be influenced by the concentration ratios of the base material, of the initiator and of the monomers. Details in this respect are described below. Furthermore, uniform monomers or alternatively mixtures of different monomers can be employed; in the latter case, grafted copolymers are formed.

The reaction with cerium(IV) salts is also possible if the solvents used are mixtures comprising organic solvents in addition to water, where these solvents are miscible with water and contain no hydroxyl groups. Particular preference is given here to dioxane or tetrahydrofuran. The proportion of the organic solvent in the reaction batch is typically 5–80% by volume, in particular 20–50% by volume. This process variant enables grafting with monomers which are only sparingly soluble in water.

In order to achieve the degree of grafting of from 0.5 to 2 mmol per gram of base material which is preferred in accordance with the invention, the process parameters of concentration of the base material (suspension density), monomer concentration, initiator concentration, pH, time, temperature and addition of polymerisation inhibitors are varied. For a given suspension density of the base material to be grafted and thus a defined reactive surface area and accessible number of functional groups which can be oxidised by the cerium(IV) salt, the degree of grafting can be set principally by variation of the following parameters in the sense of the graft product according to the invention:
a) Monomer concentration (0.05–2 mol/l, preferably 0.2–0.8 mol/l): an increase results in increased formation of graft polymer.
b) pH (0–6, preferably 1–2): an increase in the pH results in reduced formation of graft polymer.
c) Initiator concentration (from $10^{-6}$ to $10^{-1}$ mol/l; preferably $10^{-3}$–$10^{-2}$ mol/l): an increase in the initiator concentration results in a greater number of initiation points and thus graft polymer chains formed. However, premature chain termination due to participation of the metal complex in the termination reaction also occurs at an excessively high initiator concentration. As a consequence, the graft density is increased, but at the cost of the mean degree of polymerisation achieved, which means that the degree of grafting may also be reduced again.
d) Time: an extension of the reaction duration causes increased formation of graft polymer; the maximum amount in a typically asymptotic approximation is achieved after about 20 hours. The optimum reaction time is between 0.5 and 5 hours.
e) Temperature: plays only a secondary role with respect to the stability of the metal complex in the mixture and with respect to diffusion of the soluble reactants in the pore system of the support material. Preferred temperatures are between 10 and 60° C. Maxima and minima are given by the melting or boiling point of the aqueous suspension.
f) Inhibitors: the inhibitors of free-radical polymerisation reactions which are familiar to the person skilled in the art can in principle be used as moderators or for premature reaction termination in order to achieve very specific degrees of grafting.

The inhibitors include, inter alia, redox-active substances, such as quinones/hydroquinones, sodium sulfite, all readily oxidisable metal salts and metal complexes; aldehydes and similar readily oxidisable organic substances. Less suitable are compounds containing monohydroxyl or vicinal dihydroxyl functions or polyhydroxyl compounds and related substances whose primary oxidation products with the monomers present give cause for the formation of homopolymers, which are in some cases difficult to remove from the graft-polymerised support material. Atmospheric oxygen is also suitable for slowing the polymerisation reaction.

The following monomers, in particular, are preferred for the graft polymers according to the invention: N-(2-diethylaminoethyl)acrylamide, N-(2-di-methylaminoethyl)acrylamide, N-(2-trimethylammoniumethyl)acrylamide hydrochloride, N-(3-trimethylammoniumpropyl)acrylamide hydrochloride, 2-acrylamido-2-methyl-1-propanesulfonic acid, acrylic acid, acrylonitrile, and also 2-acrylamidoethanesulfonic acid, acrylamide and N,N-dimethylacrylamide.

Besides acrylic acid and acrylamide, N-substituted acrylamides in general are basically suitable for the graft polymers according to the invention so long as the amide nitrogen does not carry any substituents which contain functional groups which can be oxidised by cerium(IV) (for example hydroxyl or carboxyl groups). Furthermore, these monomers should contain ionic groups or groups which can be converted into ionic groups.

Graft polymers which contain, for example, acrylonitrile or acrylamide can be converted into ion exchangers containing carboxyl groups by polymer-analogous hydrolysis.

However, it may also be appropriate to add comonomers which do not contain ionic groups in order to regulate the charge density. Besides acryl-amide, N-(2-methoxyethyl)acrylamide and N-(2-ethoxyethyl)acrylamide, for example, are suitable for this purpose.

The corresponding methacrylic acid derivatives are likewise suitable.

It has been found that amide bonds, in particular N-alkylamide bonds, are very alkali-stable.

The sorbents according to the invention have significantly increased dynamic binding capacities compared with the sorbents as disclosed in EP 0 337 144. This has been made possible since the correlation between binding capacity and degree of grafting which results in a pronounced optimum was not recognised in the prior art. Furthermore, the sorbents according to the invention have significantly improved alkali stability.

The sorbents according to the invention can advantageously be used instead of the sorbents known hitherto, for example instead of sorbents as disclosed in EP 337 144. Thus, the sorbents according to the invention can be used for the separation of biopolymers, such as peptides, proteins or nucleic acids, but also for the separation and purification of viruses, cell organelles, prokaryotic or eukaryotic cells, and protein complexes.

Even without further comments, it is assumed that a person skilled in the art will be able to utilise the above description in its broadest scope. The preferred embodiments and examples should therefore merely be regarded as descriptive disclosure which is absolutely not limiting in any way.

The complete disclosure content of all applications, patents and publications mentioned above and below as well as of the corresponding application DE 101 49 256.1, filed on May 10, 2001, is incorporated into this application by way of reference.

EXAMPLES

Unless otherwise stated, the weight data for base materials relate to the dry weight for the determination of which the material is washed five times with an excess of acetone and subsequently dried to constant weight at 50° C. under reduced pressure.

Room temperature (R.T.) means from 15 to 30° C.

A Preparation Examples

Preparation Example A1

Preparation of a DEAE Ion-Exchanger Material a) Monomer Solution:

The monomer solution is obtained by acrylation of 127 g (1.09 mol) of N,N-diethylenediamine, dissolved in 1.2 liters of water, at 0–5° C. To this end, 95 g (1.05 mol) of acryloyl chloride are added to the stirred amine solution at such a rate that the indicated temperature range is maintained during the reaction. When the addition of the acryloyl chloride is complete, the mixture is allowed to react for a further 30 minutes, and the solution is then adjusted to pH 2.0 using 65% nitric acid.

b) Grafting:

A mixture of 1 kg (moist weight) of the base material (hydrophilic, macroporous, highly crosslinked polymer material, copolymer of N,N-methylenebisacrylamide and 3-allyloxy-1,2-propanediol (1:0.6); manufacturer: Degussa/Röhm, Darmstadt, Germany) is added to the freshly prepared monomer solution in a temperature-controllable stirred reactor. The mixture of base material and monomer solution is stirred up to give a suspension, and water is added so that a total volume of 3 liters is obtained. The suspension is subsequently heated to 42° C. and blanketed with nitrogen, and a solution of 16.44 g of ammonium cerium(IV) nitrate (30 mmol) in 60 ml of 0.5 M nitric acid is added with further stirring.

After 12–18 hours at 42° C., the suspension is filtered or centrifuged, and the gel which remains is washed a number of times and successively with water, a mixture of 0.2M ascorbic acid/0.5M sulfuric acid, then again with water and with 1M NaOH and again with water until all the soluble constituents of the reaction mixture have been removed from the gel down to the limits of the detection sensitivity of standard analytical methods.

The finished product is stored in suspension with salt solution containing 20% of ethanol or, for example, in 0.1M NaOH at R.T.

Analyses:

The binding capacity for BSA is about 500 mg/g (based on the dry weight of the gel).

The degree of grafting is about 1 mmol/g (in monomer units, based on the dry weight), measured by acid/base titration of the immobilised DEAE groups.

Preparation Example A2

Preparation of an $SO_3$ Ion-Exchanger Material

The cation exchanger containing $SO_3$ groups is prepared analogously to the description of Preparation Example A1, using 2-acrylamido-2-methyl-1-propanesulfonic acid as monomer instead of the monomer mentioned therein.

The preparation is repeated with various variants, giving various preparations of exchangers with different degrees of grafting. The respective degree of grafting is determined by elemental analysis of the sulfur content.

Preparation Example A3

Preparation of a Strongly Basic Ion-Exchanger Material (TMAE)

The anion exchanger containing TMAE groups is prepared analogously to the description of Preparation Example A1, using N-(2-trimethylammoniumethyl)acrylamide hydrochloride as monomer instead of the monomer mentioned therein.

B Use Examples

Use Example B1

Determination of the Binding Capacity with Bovine Serum Albumin (Breakthrough Curve)

Ion-exchanger material prepared in accordance with Example A1 is introduced into a SuperFormance® glass column (150×16 mm; depth of the sorbent bed 125 mm) and equilibrated with the application buffer (50 mM TRIS buffer, pH 8.3). A solution of bovine serum albumin (5 mg/ml) in this buffer is applied continuously (linear flow: 100 cm/h), and the elution diagram is measured by photometry at 280 nm. The capacity (125 mg/ml of gel) is determined from the breakthrough curve (10%).

The experiment is repeated with higher flow rates. The results are shown in FIG. 1. Even at a linear flow rate of 1500 cm/h, about 70% of the maximum binding capacity is still measured.

Use Example B2

Determination of the Binding Capacity with Lysozyme (Breakthrough Curve)

Ion-exchanger material prepared in accordance with Example A2 is introduced into a SuperFormance® glass column (150×16 mm; depth of the sorbent bed 100 mm) and equilibrated with the application buffer (20 mM phosphate buffer, pH 7.0). A solution of lysozyme (5 mg/ml) in this buffer is applied continuously (linear flow: 100 cm/h), and the elution diagram is measured by photometry at 280 nm. The capacity (110 mg of lysozyme/ml of gel) is determined from the breakthrough curve (10%).

The experiment is repeated with various preparations (different degree of grafting). The results are shown in FIG. 2. The binding capacity as a function of the degree of grafting describes a curve with a clear maximum at about 0.6 mM per gram of dry weight (corresponding to 2% of sulfur).

Use Example B3

Shelf Life of the Sorbents in Alkaline Solution

DEAE ion exchanger prepared in accordance with Example A1 is stored in aqueous NaOH solution (1 or 5 mol/l) at room temperature. After one year, the binding capacity had dropped by 5% (in 1 mol/l of NaOH) or 10% (in 5 mol/l of NaOH).

What is claimed is:

1. An alkali-stable hydrophilic sorbent for ion-exchange chromatography made by at least:
   a) providing a base material, wherein the base material is a crosslinked vinyl polymer comprising diol group-containing vinyl monomers and crosslinking monomers whose polymerizable groups are linked by carboxamide group-containing chains, and where this base material comprises more than 1 mmol of diol groups per gram;
   b) adding the base material to an aqueous solution of the monomer to be grafted, where the monomer contains an ionic group or a precursor group for an ionic group;
   c) grafting the monomers to the base material, where the graft polymerization is initiated by cerium(IV) ions, and the suspension density, monomer concentration, initiator concentration, pH, time, temperature and addition of polymerization inhibitors are selected to achieve a degree of grafting of from 0.5–2 mmol per gram of the base material;
   d) and, optionally converting the precursor group introduced in b) into an ionic group.

2. An alkali-stable hydrophilic sorbent for ion-exchange chromatography according to claim 1, further comprising adding a neutral monomer at b).

3. A method of chromatographically separating at least two substances, comprising providing an alkali-stable hydrophilic sorbent according to claim 1.

4. A process for preparing an alkali-stable hydrophilic sorbent for ion-exchange chromatography comprising:
   a) providing a base material, where the base material is a crosslinked vinyl polymer comprising diol group-containing vinyl monomers and crosslinking monomers whose polymerizable groups are linked by carboxamide group-containing chains, and where this base material comprises more than 1 mmol of diol groups per gram;
   b) adding the base material to an aqueous solution of the monomer to be grafted, where the monomer contains an ionic group or a precursor group for an ionic group;
   c) grafting the monomers to the base material, where the graft polymerization is initiated by cerium(IV) ions, and selecting the monomer concentration at a given suspension density, initiator concentration at a given monomer concentration and suspension density, pH, time, temperature and addition of polymerization inhibitors to achieve a degree of grafting of 0.5–2 mmol per gram of the base material;
   d) and finally, optionally converting the precursor group introduced in b) into an ionic group.

5. A process for preparing an alkali-stable, hydrophilic sorbent for ion-exchange chromatography according to claim 4, further comprising adding a neutral monomer at b).

6. An alkali-stable hydrophilic sorbent according to claim 1, wherein the base material comprises a copolymer, in turn comprising N,N-methylenebisacrylamide and 3-allyloxy-1,2-propanediol.

7. A process according to claim 4, wherein the monomer concentration is 0.05–2 mol/l.

8. A process according to claim 4, wherein the pH is 0–6.

9. A process according to claim 4, wherein the initiator concentration is $10^{-6}$–$10^{-1}$ mol/l.

10. A process according to claim 4, wherein the reaction time is 0.5–5 hours.

11. A process according to claim 4, wherein the temperature is 10–60° C.

12. An alkali-stable hydrophilic sorbent according to claim 1, wherein the monomer is N-(2-diethylaminoethyl)acrylamide, N-(2-di-methylaminoethyl)acrylamide, N-(2-trimethylammoniumethyl)acrylamide hydrochloride, N-(3-trimethylammoniumpropyl)acrylamide hydrochloride, 2-acrylamido-2-methyl-1-propanesulfonic acid, acrylic acid, acrylonitrile, 2-acrylamidoethanesulfonic acid, acrylamide or N,N-dimethylacrylamide.

13. An alkali-stable hydrophilic sorbent according to claim 2, wherein the further neutral monomer is N-(2-methoxyethyl)acrylamide or N-(2-ethoxyethyl)acrylamide.

14. A process for preparing a hydrophilic sorbent for ion exchange chromatography, comprising:
   grafting a monomer comprising an ionic group or a precursor group for anionic group to a base material comprising a crosslinked vinyl polymer, in turn comprising diol group-containing vinyl monomers and crosslinking monomers whose polymerizable groups are linked by carboxamide group-containing chains.

15. A process according to claim 4, wherein the monomer concentration is 0.2–0.8 mol/l.

16. A process according to claim 4, wherein the pH is 1–2.

17. A process according to claim 4, wherein the initiator concentration is $10^{-3}$–$10^{-2}$ mol/l.

18. A process according to claim 14, wherein the base material comprises more than 1 mmol of diol groups per gram.

19. A process according to claim 14, wherein the graft polymerization is initiated by cerium(IV) ions.

20. A process according to claim 14, wherein a degree of grafting of 0.5–2 mmol per gram of support is achieved.

21. An alkali-stable, hydrophilic sorbent for ion-exchange chromatography, comprising:
   a base material comprising a crosslinked vinyl polymer, wherein the crosslinked vinyl polymer comprises diol group-containing vinyl monomers and crosslinking monomers whose polymerizable groups are linked by carboxamide group-containing chains, wherein the base material comprises more than 1 mmol of diol groups per gram; and
   a monomer grafted to the base material with a degree of grafting of 0.5–2 mmol per gram of the base material.

* * * * *